(12) United States Patent
Tamir

(10) Patent No.: US 10,199,828 B2
(45) Date of Patent: Feb. 5, 2019

(54) PHASE COMPENSATION SYSTEM

(71) Applicant: Oren Tamir, Ra'anana (IL)

(72) Inventor: Oren Tamir, Ra'anana (IL)

( * ) Notice: Subject to any disclaimer, the term of this patent is extended or adjusted under 35 U.S.C. 154(b) by 0 days.

(21) Appl. No.: 15/912,731

(22) Filed: Mar. 6, 2018

(65) Prior Publication Data

US 2018/0198280 A1 Jul. 12, 2018

Related U.S. Application Data

(63) Continuation of application No. 15/752,085, filed as application No. PCT/IL2016/050588 on Jun. 7, 2016.

(30) Foreign Application Priority Data

Aug. 16, 2015 (IL) .......................................... 240595

(51) Int. Cl.
| | | |
|---|---|---|
| *G06F 19/00* | (2018.01) | |
| *H02J 3/18* | (2006.01) | |
| *G05B 19/042* | (2006.01) | |
| *G05F 1/66* | (2006.01) | |
| *G06Q 50/06* | (2012.01) | |
| *G06Q 10/06* | (2012.01) | |
| *H02J 3/38* | (2006.01) | |
| *H02J 13/00* | (2006.01) | |
| *H02J 3/14* | (2006.01) | |
| *H02J 3/00* | (2006.01) | |

(52) U.S. Cl.
CPC ........ *H02J 3/1814* (2013.01); *G05B 19/0425* (2013.01); *G05F 1/66* (2013.01); *G06Q 10/0631* (2013.01); *G06Q 50/06* (2013.01); *H02J 3/14* (2013.01); *H02J 3/1878* (2013.01); *H02J 3/381* (2013.01); *H02J 13/0089* (2013.01); *H02J 2003/001* (2013.01); *H02J 2003/003* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,727,103 | A * | 4/1973 | Finch ..................... | H02H 3/021 307/127 |
| 4,004,191 | A | 1/1977 | Koroljuk et al. | |
| 6,021,035 | A * | 2/2000 | Larsen ................... | H02H 3/023 361/54 |
| 7,753,122 | B2 * | 7/2010 | Curlett ................... | E21B 43/17 166/302 |

(Continued)

FOREIGN PATENT DOCUMENTS

| | | |
|---|---|---|
| CN | 1319927 A | 10/2001 |
| EP | 2672603 A1 | 12/2013 |

(Continued)

*Primary Examiner* — Kidest Bahta
(74) *Attorney, Agent, or Firm* — Browdy and Neimark, P.L.L.C.

(57) ABSTRACT

Systems and methods are provided for a three-phase compensation system, whereby an electric circuit is configured to be connected with three input phases of a power source and to supply three respective output phases, said electric circuit further configured to compensate for one or two malfunctioning input phases of said three input phases by supplying current from a functioning input phase of said three input phases to replace a malfunctioning input phase.

4 Claims, 14 Drawing Sheets

(56) References Cited

U.S. PATENT DOCUMENTS

| | | | |
|---|---|---|---|
| 2009/0085403 A1 | 4/2009 | Kim et al. | |
| 2010/0026093 A1* | 2/2010 | Bleus | H02J 9/062 307/24 |
| 2010/0090537 A1* | 4/2010 | Larsen | H02J 3/1807 307/105 |
| 2010/0292853 A1* | 11/2010 | McDonnell | H02J 3/34 700/287 |
| 2015/0084420 A1* | 3/2015 | Dickerson | H02J 9/06 307/29 |
| 2015/0102673 A1 | 4/2015 | Alshinnawi et al. | |

FOREIGN PATENT DOCUMENTS

| | | |
|---|---|---|
| GB | 367455 A | 2/1932 |
| GB | 396759 A | 8/1933 |
| GB | 413723 A | 7/1934 |
| GB | 597302 A | 1/1948 |
| RU | 2122273 C1 | 11/1998 |
| RU | 66619 U1 | 9/2007 |
| RU | 2340063 C1 | 11/2008 |
| RU | 2353038 C1 | 4/2009 |
| RU | 2551351 C1 | 5/2015 |
| SU | 633110 A1 | 11/1978 |
| WO | 2013070237 A1 | 5/2013 |
| WO | 2014191692 A1 | 12/2014 |

\* cited by examiner

Fig. 4

PHASE COMPENSATION SYSTEM

FIELD OF THE INVENTION

The present invention generally relates to power grid backup systems and specifically to a three-phase compensation system.

BACKGROUND

A common problem consumers of three-phase power supply often encounter is the "loss" of a phase. Sometimes, one (or even two) of the phases supplied by the power provider malfunctions. In such a case, consumers may use substituting power sources such as, for example, a generator in order to compensate for the "lost" phase(s). Consumers who have no alternative power provider stay without electricity which should have been provided by the "lost" phase(s).

GB Pub. Num. 367455 describes substituting sources in service. In a system, such as a ship propulsion system, having main and auxiliary generators driven by a common prime mover, such as a diesel engine, and having a second auxiliary generator which may form part of a similar set, a load circuit which has to be continuously supplied is automatically transferred from one auxiliary generator to another if the voltage of the first falls below a given value when the second machine is generating an adequate voltage.

GB Pub. Num. 396759 describes systems depending upon static transformers. A 3 phase/4 phase/3 phase overhead line transmission system in which the 4-phase high tension current is carried by at least four conductors and a ground wire, includes protective arrangements incorporating a "balanced beam " relay whereby, on a fault occurring on a line, that line and the line carrying the "quarter-phase" associated with it are disconnected and earthed, the system then operating as a 3phase/2-phase 3 wire/3-phase system. If a spare pair of conductors is available they may replace the broken down conductor and associated line.

GB Pub. Num. 413723 describes an electric relay arrangement responsive to the phase relationship between corresponding voltages of two three-phase systems involves a mechanically balanced relay having a contact member differentially controlled by two coils respectively energized in accordance with two voltages whose magnitudes are dependent on such phase relationship.

GB Pub. Num. 597302 describes relay apparatus for connecting a network to supply mains when the voltage of the former is lower by a predetermined amount than that of the latter, comprises an induction relay having a plurality of electromagnets, one of said magnets having a winding connected across the supply mains or the network and another of said magnets having a winding supplied with current proportional to the difference in voltage between the network and the supply mains to cause the relay to operate a circuit-breaker connected between the mains and the network.

RU Pub. Num. 66619 describes three-phase power factor corrector comprising a power inverter unit, power sensors ranging power supply and control system, characterized in that the node power inverter unit consists of two power inverter modules, each of which contains six key elements included three-phase bridge circuit, three-phase inductor and a storage capacitor with a voltage sensor and control system comprises a unit ADC block determine the reference compensating current with PI voltage on the capacitor, the current PID controllers and the unit vector pulse width modulation, the output of the ADC is connected to the inputs of the block determine the reference equalizing currents with PI voltage on the capacitor, the output of which is connected via a current block of PID controllers to the input of the block vector pulse-width modulation, which is the final output block management.

RU Pub. Num. 2122273 describes a device which has three under-voltage relays with make and break contacts, correcting capacitors, phase-shifting reactors, and transient-load terminals Three newly introduced phase-correcting capacitors are inserted between phase-shifting reactors and three-phase load terminals; each capacitor is shorted out by parallel-connected make contacts of under-voltage relays of inherent and lagging phases; each phase-shifting reactor is shorted out by parallel-connected contacts of under-voltage relays of adjacent phases.

RU Pub. Num. 2340063 describes a device containing terminals of network A, B, C, three voltage-check relays with group of normally closed, group of normally open and additional group of contacts, common capacitor, phase throttles and input terminals Thus network terminals are connected to AC source, each relay is connected on phase voltage between similar phase and neutral wire. Common capacitor is connected between previous and recovered phases. Phase throttles are connected in break of corresponding phases between network terminals and input terminals. And throttle of recovered phase is bridged. Throttles of composite phases are used for additional turn of adjacent phase voltage vectors.

RU Pub. Num. 2353038 describes a device including network terminals, three voltage control relays, three phase chokes, a contact unit with two groups of contacts having common contact points and a common capacitor. The first group of contacts contains three pairs of normally closed contacts, while the first pair includes serial connection of the first relay contact with the second relay contact, the second pair—the second relay contact with the third relay contact, the third pair—the third relay contact with the first relay contact. Besides, all pair inputs are coupled with the corresponding phases, while their outputs—with common point of the first group of contacts. The second group of contacts includes also three pairs of contacts. In addition, the first pair includes serial connection of the first relay closed contact and open contact the second relay, the second pair—closed contact of the second relay contact and open contact of the third relay, the third pair—closed contact of the third relay and open contact of the first relay. Besides, inputs from all pairs are coupled with corresponding phases, while their outputs are connected to the common point of the second group of contacts. There is a common capacitor being connected between the common point of the first group and common point of the second group.

RU Pub. Num. 2551351 describes a device comprising network terminals, three fast-operate fast-release voltage relays with closing and opening contacts, seven repeater relays per a phase with closing and opening contacts, three phase-recovering capacitors, three phase-shifting chokes, three phase-compensating capacitors, terminals for the connection of a three-phase load and a power supply source. The voltage relays are coupled to phase voltage of the respective phases in the network, the phase-recovering capacitors are coupled to linear voltage, at that each of the capacitors is connected in series to an opening contact of the repeater relay of the respective phase, each of the phase-shifting chokes is shunted by the closing contacts of the first and second repeater relays of the respective phase and by the in-series closing contacts of the third and fourth repeater relays of the respective phase, the repeater relays are connected to the negative output of the power supply source directly and to the positive output through the closing contacts of the voltage relay respectively. Each phase-compensating capacitor is shunted by the closing contacts of the fifth and sixth repeated relay of the respective phase and the phase-shifting capacitor of each phase is coupled between the same phase of the network and the phase next to the retarding phase through the opening contact of the seventh repeated relay of the respective phase.

SU Pub. Num. 633110 describes an automatic redundancy arrangement for power supply source None of the above offer to compensate for the "lost" phase(s) using the other available phase(s).

There is a long felt need for a compensation system enabling a consumer to receive a three-phase power supply in cases where one or two of the three phases malfunctions without using substituting power provider(s).

SUMMARY

According to an aspect of the present invention there is provided a three-phase compensation system, comprising: an electric circuit configured to be connected with a three-phase power source configured to supply three phase of a three-phase power supply in the absence of one or two of the three phases.

The three-phase power source may comprise one of a three-phase generator and a three-phase alternator.

The electric circuit may comprise first, second and third control relays connected with each other, each comprising first and second normally open contact inputs, first and second normally open contact outputs, first and second normally closed contact inputs, first and second normally closed contact outputs, a control contact input and a control contact output. (Hereinbelow, "contact inputs" or "contacts" for short are also referred to as "in-contacts". Also, "contact outputs" or "contacts" for short are also referred to as "out-contacts".)

According to another aspect of the present invention there is provided a method of compensating for a lost phase, comprising: providing a three-phase compensation system, comprising: an electric circuit comprising first, second and third control relays connected with each other; the electric circuit configured to be connected with consumers and with a three-phase power source configured to supply three phases, one to each of the first, second and third control relays respectively; and when one of the three phases does not supply current to its respective control relay, compensating for the malfunctioning phase by supplying current from one of the other two control relays.

The three-phase compensation system may be configured to connect to the three-phase power source as generated by one of a three-phase generator and a three-phase alternator.

The first, second and third control relays may each comprise first and second normally open contact inputs, first and second normally open contact outputs, first and second normally closed contact inputs, first and second normally closed contact outputs, a control contact input and a control contact output.

According to another aspect of the present invention there is provided a method of compensating for a lost phase, comprising: providing a three-phase compensation system, comprising: an electric circuit comprising first, second and third control relays connected with each other; the electric circuit configured to be connected with consumers and with a three-phase power source configured to supply three phases, one to each of the first, second and third control relays respectively; and when two of the three phases do not supply current to their respective control relays, compensating for the malfunctioning phases by supplying current from the remaining control relay.

The three-phase power source may comprise one of an electricity company, a three-phase generator and a three-phase alternator.

The first, second and third control relays may each comprise first and second normally open contact inputs, first and second normally open contact outputs, first and second normally closed contact inputs, first and second normally closed contact outputs, a control contact input and a control contact output.

BRIEF DESCRIPTION OF DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 4 shows a schematic view of an IEC control relay;

DETAILED DESCRIPTION OF THE INVENTION

Figure 1:
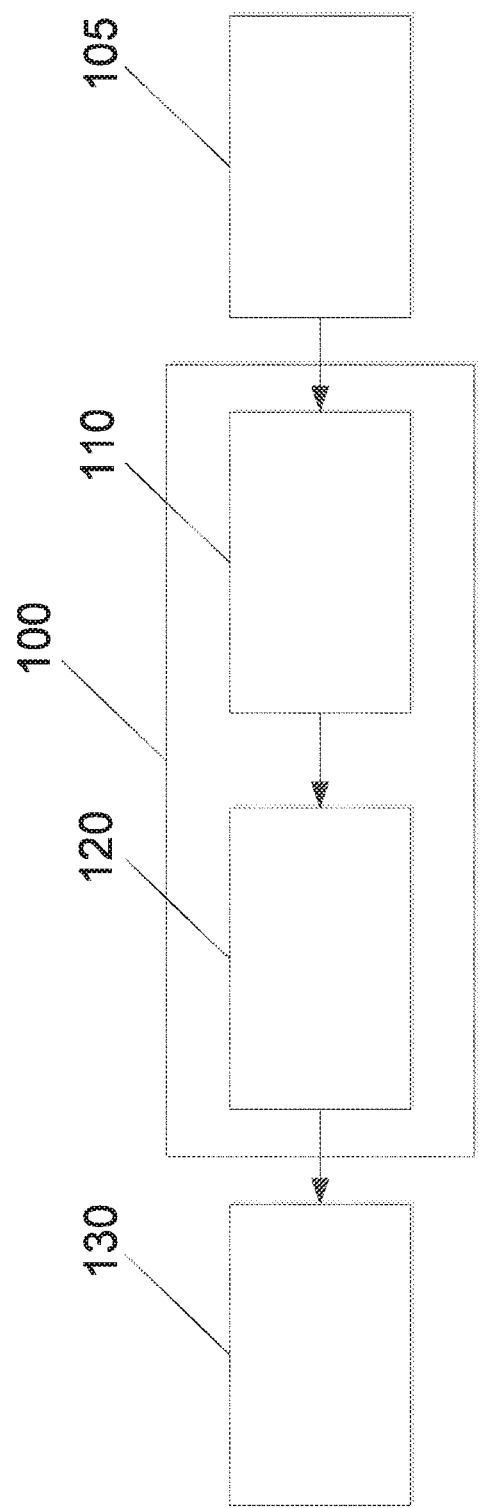
FIG. 1 shows a schematic block diagram of an exemplary existing distribution board.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present invention provides a three-phase compensation system for cases where one or two of the three phases malfunctions.

FIG. 1 shows a schematic block diagram of an exemplary existing distribution board 100 comprising a three-phase switch 110 and a three-phase residual current device 120.

Three phases supplied by the power provider 105 (e.g. Electricity Company, three-phase alternator, three-phase generator etc.), pass through the three-phase switch 110, then through the three phase residual current device 120 and to consumers 130 (e.g. via circuit breakers—not shown).

Figure 2A:
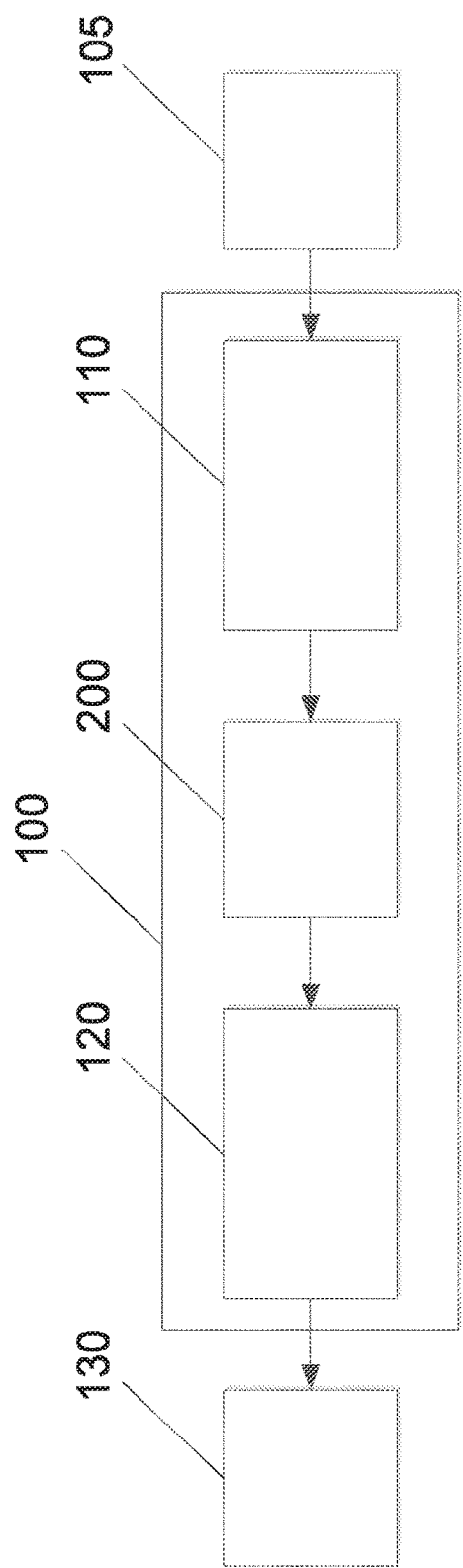
FIGS. 2A and 2B show schematic block diagrams of two exemplary implementation options of the three-phase compensation system of the present invention in the exemplary existing distribution board of FIG. 1.
Figure 2B:
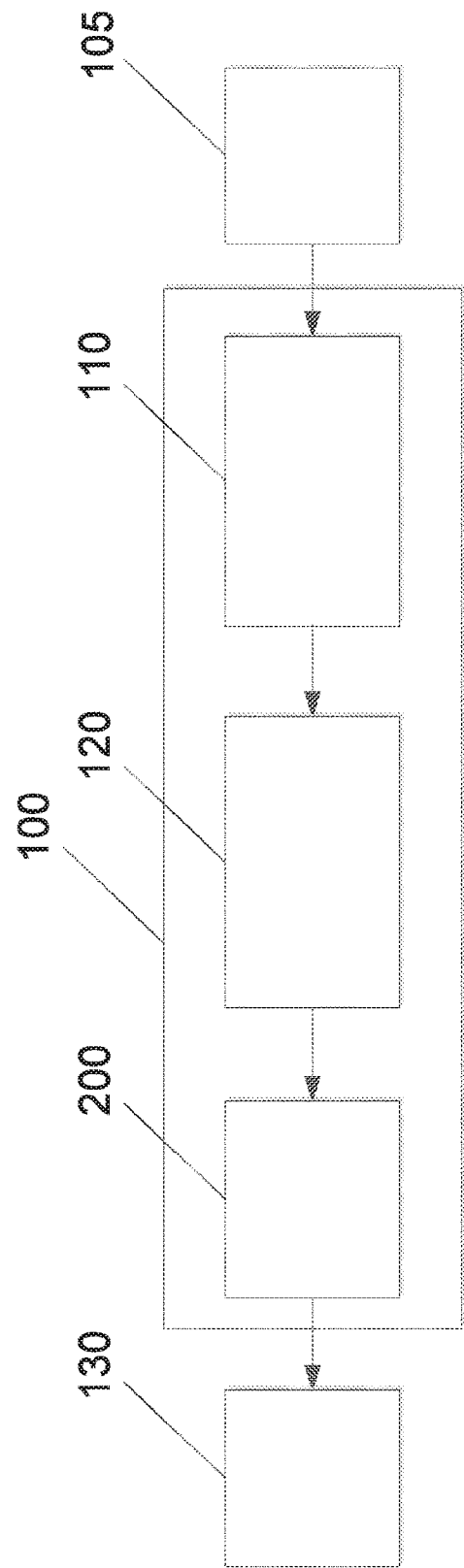

FIGS. 2A and 2B show schematic block diagrams of two exemplary implementation options of the three-phase compensation system 200 of the present invention in the exemplary existing distribution board 100 of FIG. 1.

FIG. 2A shows the three-phase compensation system 200 of the present invention implemented between the three-phase switch 110 and the three-phase residual current device 120.

FIG. 2B shows the three-phase compensation system 200 of the present invention implemented between the three-phase residual current device 120 and the consumers 130.

Figure 3:
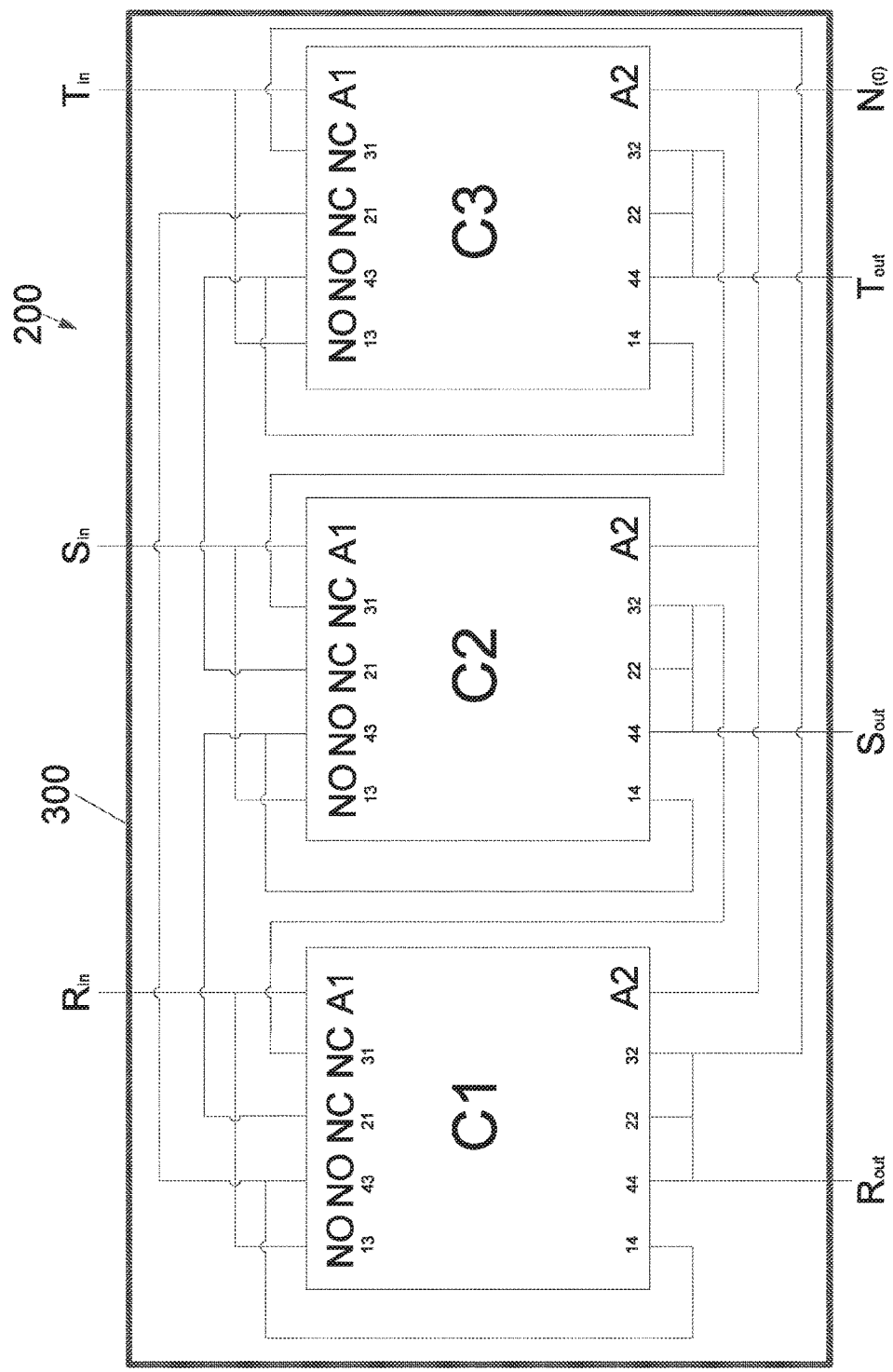
FIG. 3 shows a schematic representation of the three-phase compensation system according to embodiments of the present invention.

FIG. 3 shows a schematic representation of the three-phase compensation system 200 according to embodiments of the present invention, comprising: a housing 300 comprising three control relays C1, C2 and C3 such as for example IEC control relay 700-K22Z available from http://ab.rockwellautomation.com/Relays-and-Timers/700-K-IEC-Control-Relays. Each control relay comprises two Normally Open contact inputs, 13 and 43 (also referred to hereinbelow as "normally open in-contacts"), two Normally Closed contact inputs, 21 and 31 (also referred to hereinbelow as "normally closed in-contacts") and a control contact input A1 (also referred to hereinbelow as a "control in-contact"). Each control relay also comprises two Normally Open contact outputs, 14 and 44 (also referred to hereinbelow as "normally open out-contacts"), and two Normally Closed contact outputs, 22 and 32 (also referred to hereinbelow as "normally closed in-contacts"). A schematic view of the control relay is presented in FIG. 4.

Figure 4:
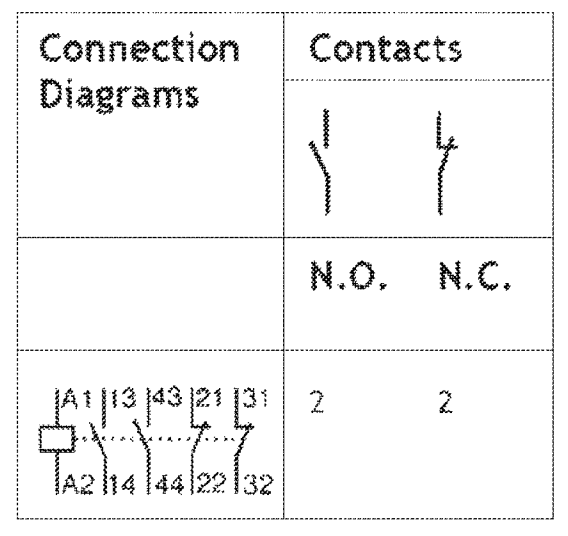

As can be seen in FIG. 4, the Normally Open contacts are open in the absence of electric current and the Normally Closed contacts are closed in the absence of electric current. When an electric current passes from control contact input A1 to control contact output A2 (connected to neutral N (0)), the Normally Open contacts are closed and the Normally Closed contacts are opened.

Referring to FIG. 3, attention is drawn to terminals of control relay C3. In normal operation, control contact input A1 receives an electric current of input phase T (also referred to herein as a "phase-in"). The electric current passes from control contact input A1 to control contact output A2 connected to N (0), which causes the connections between contacts 13 and 14 and between contacts 43 and 44 to be closed and the connections between contacts 21 and 22 and between contacts 31 and 32 to be opened thus enabling the electric current of phase T to pass from contact 13 to contact 14 to contact 43 to contact 44 to Tout.

The same happens in control relay C2 when it receives an electric current of phase S and in control relay C1 when it receives an electric current of phase R.

In the absence of electric current of phase T in control relay C3, the connections between contacts 13 and 14 and between contacts 43 and 44 are open and the connections between contacts 21 and 22 and between contacts 31 and 32 are close. In such a case, electric current of phase R may be supplied by:

Contact 43 of C1 to contact 21 of C3 to contact 22 of C3 to Tout. and/or

Contact 32 of C1 to contact 31 of C3 to contact 32 of C3 to Tout.

It will be appreciated that contact 43 of C1 may be alternatively connected to contact 31 of C3. In such a case, contact 32 of C1 is connected to contact 21 of C3.

The connection of contacts 21 and 31 of C3 to the electric current of phase R enables three-phase normal operation in the absence of phase T and moreover in the absence of at least one other phase (R or S), namely, in the absence of T and S or in the absence of T and R.

The connection of contacts 21 and 31 of C2 to the electric current of phase T enables three-phase normal operation in the absence of phase S and moreover in the absence of at least one other phase (R or T), namely, in the absence of S and R or in the absence of S and T.

The connection of contacts 21 and 31 of C1 to the electric current of phase S enables three-phase normal operation in the absence of phase R and moreover in the absence of at least one other phase (T or S), namely, in the absence of R and S or in the absence of R and T.

Figure 5:
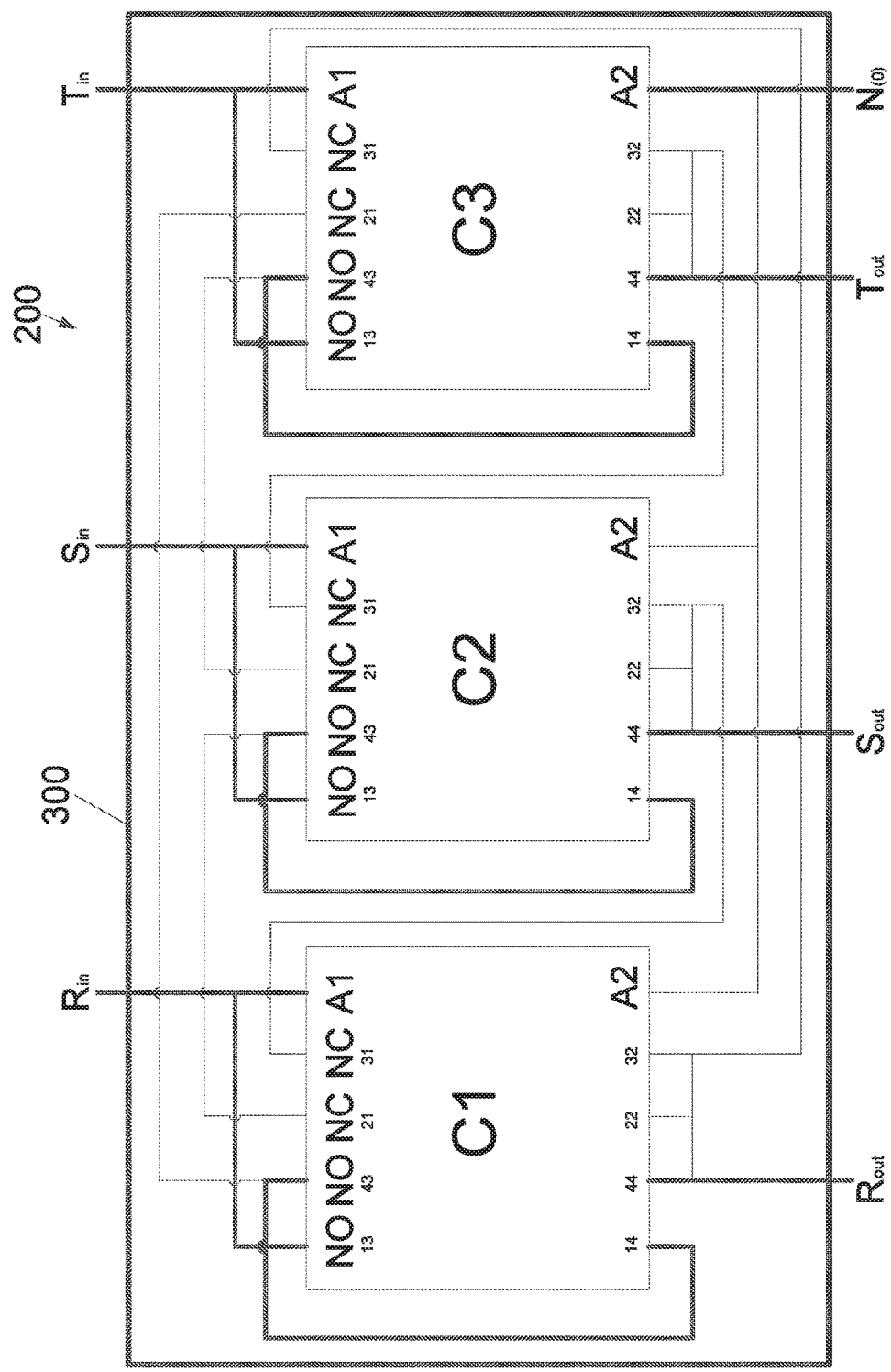
FIG. 5 shows an exemplary scenario according to the representation of FIG. 3 where there is an electric current in each phase R, S and T.

FIG. 5 shows an exemplary scenario according to the representation of FIG. 3 where there is an electric current in each phase R, S and T (normal operation). The electric current of phase T passes from contact A1 of C3 to contact A2 of C3 to N (0) and causes the connections between contacts 13 and 14 and between contacts 43 and 44 to be closed, namely, the electric current passes from Tin to contact 13 to contact 14 to contact 43 to contact 44 to Tout. The same happens in phases S and R.

Figure 5A:
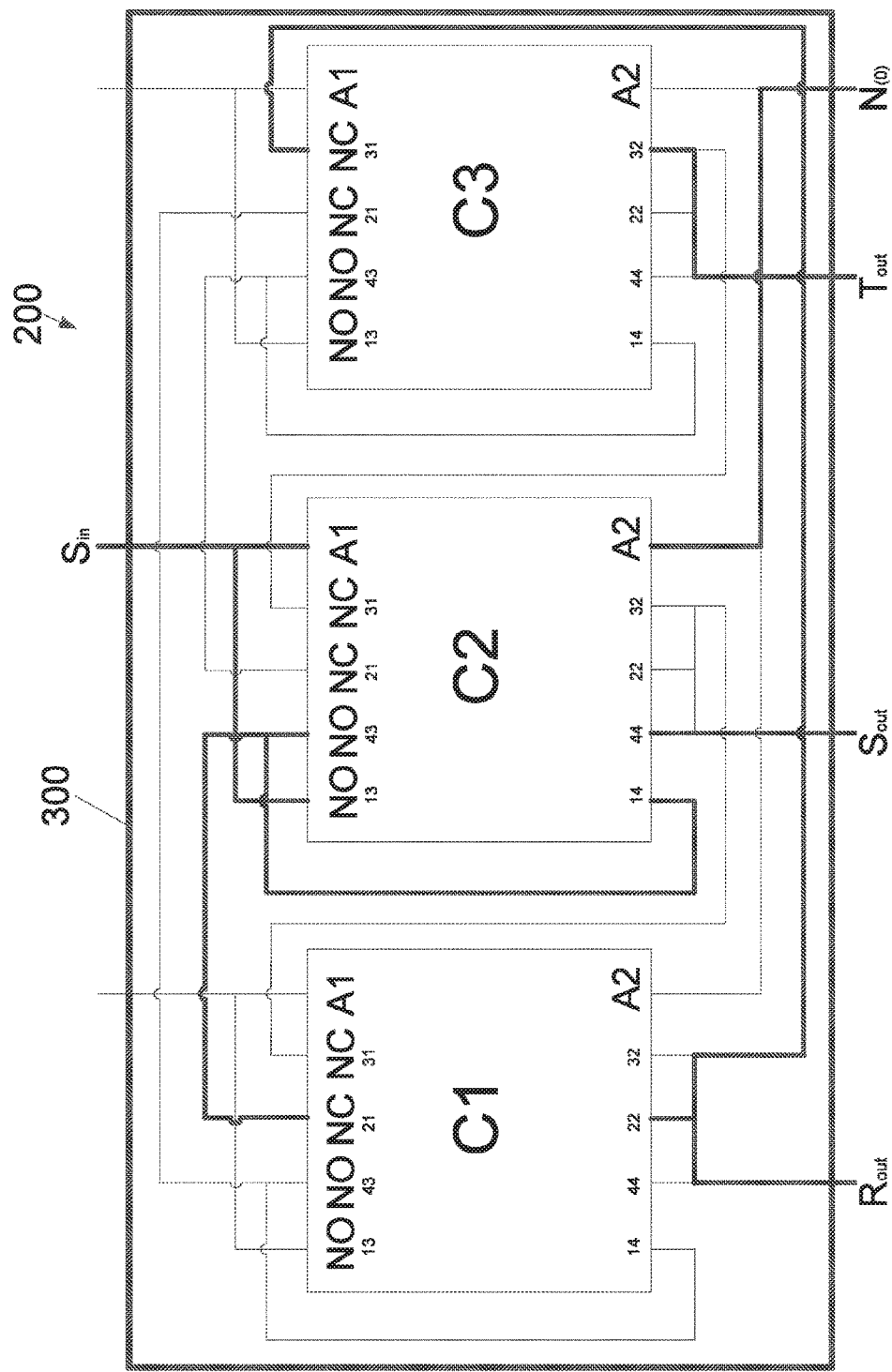
FIG. 5A shows an exemplary scenario according to the representation of FIG. 3 where there is an electric current only in phase S.

FIG. 5A shows an exemplary scenario according to the representation of FIG. 3 where there is an electric current only in phase S. The electric current of phase S passes from contact A1 of C2 to contact A2 of C2 to N (0) and causes the connections between contacts 13 and 14 and between contacts 43 and 44 to be closed, namely, the electric current pass from Sin to contact 13 to contact 14 to contact 43 to contact 44 to Sout. In C1 and C3 there is no electric current supplied by Rin and Tin respectively, hence the connections between contacts 21 and 22 and contacts 31 and 32 of C3 are closed and the connections between contacts 21 and 22 and contacts 31 and 32 of C1 are closed. Electric current supplied by Sin passes to contact 13 of C2 to contact 14 of C2 to contact 43 of C2 to contact 21 of C1, from contact 21 of C1 to contact 22 of C1 and from there both to Rout and to contact 31 of C3 to contact 32 of C3 to Tout.

The result is three-phase electric supply though only one phase is available.

Figure 5B:
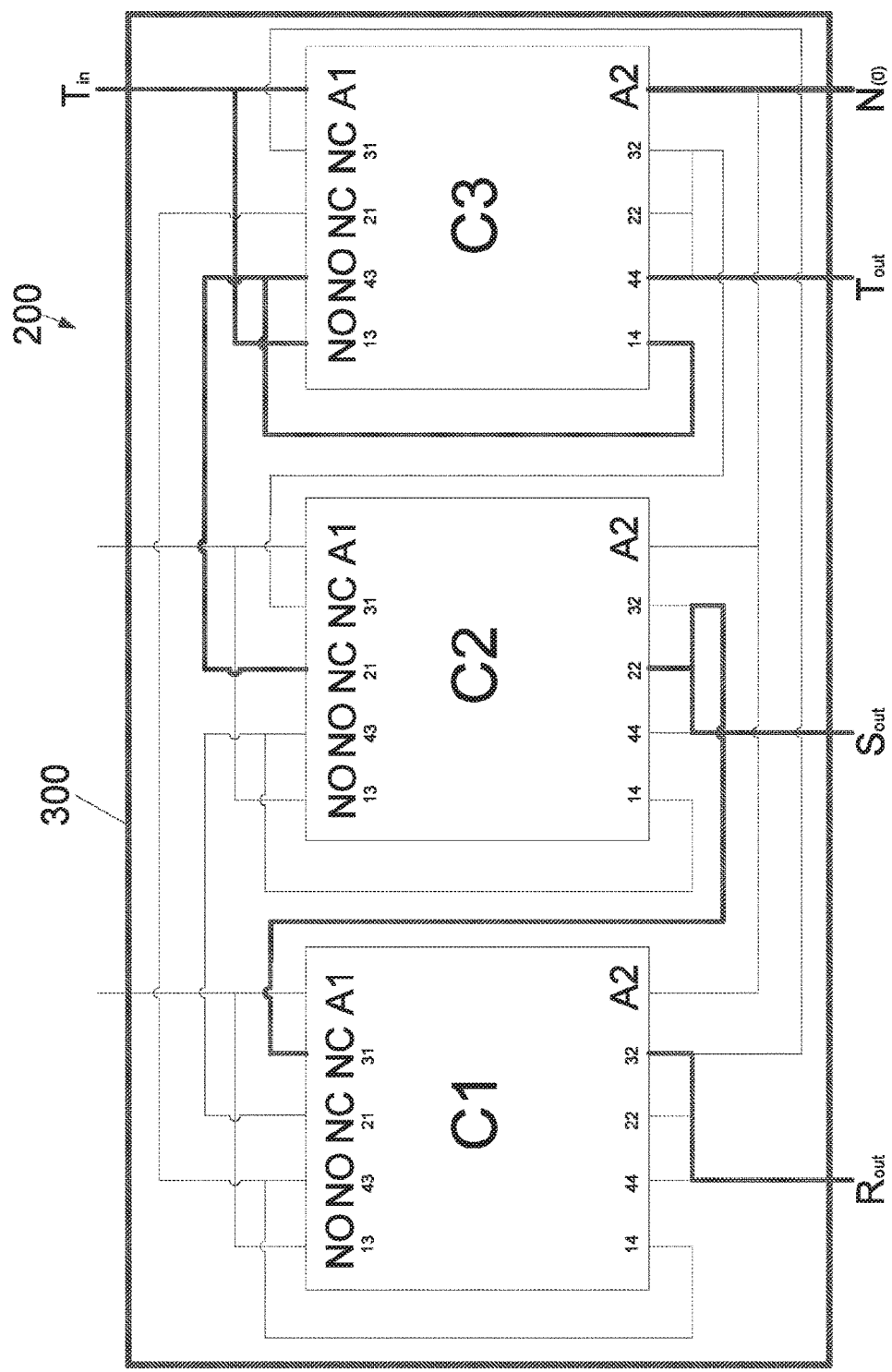
FIG. 5B shows an exemplary scenario according to the representation of FIG. 3 where there is an electric current only in phase T.

FIG. 5B shows a similar exemplary scenario according to the representation of FIG. 3 where there is an electric current only in phase T.

Figure 5C:
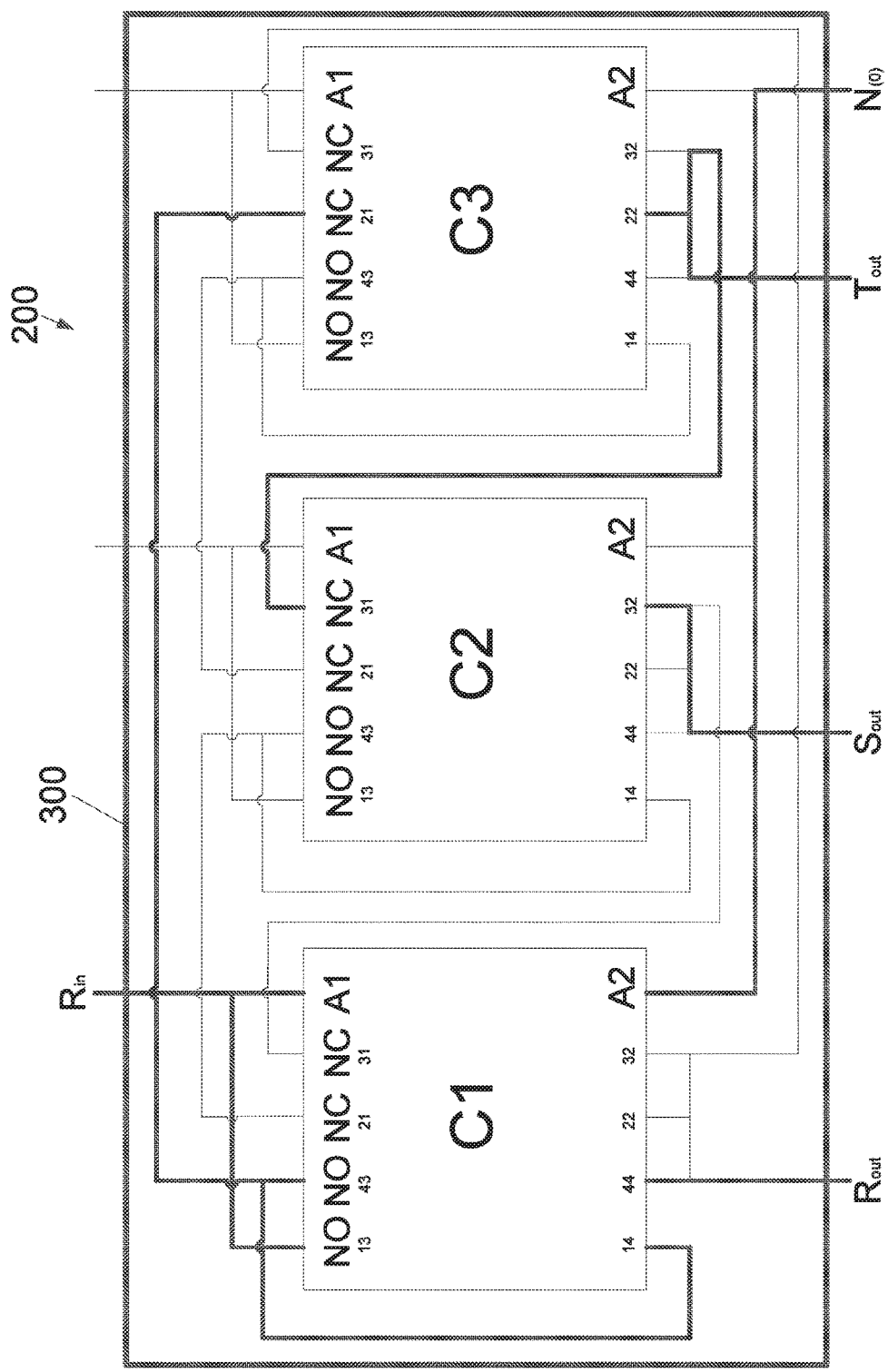
FIG. 5C shows an exemplary scenario according to the representation of FIG. 3 where there is an electric current only in phase R.

FIG. 5C shows a similar exemplary scenario according to the representation of FIG. 3 where there is an electric current only in phase R.

Figure 6:
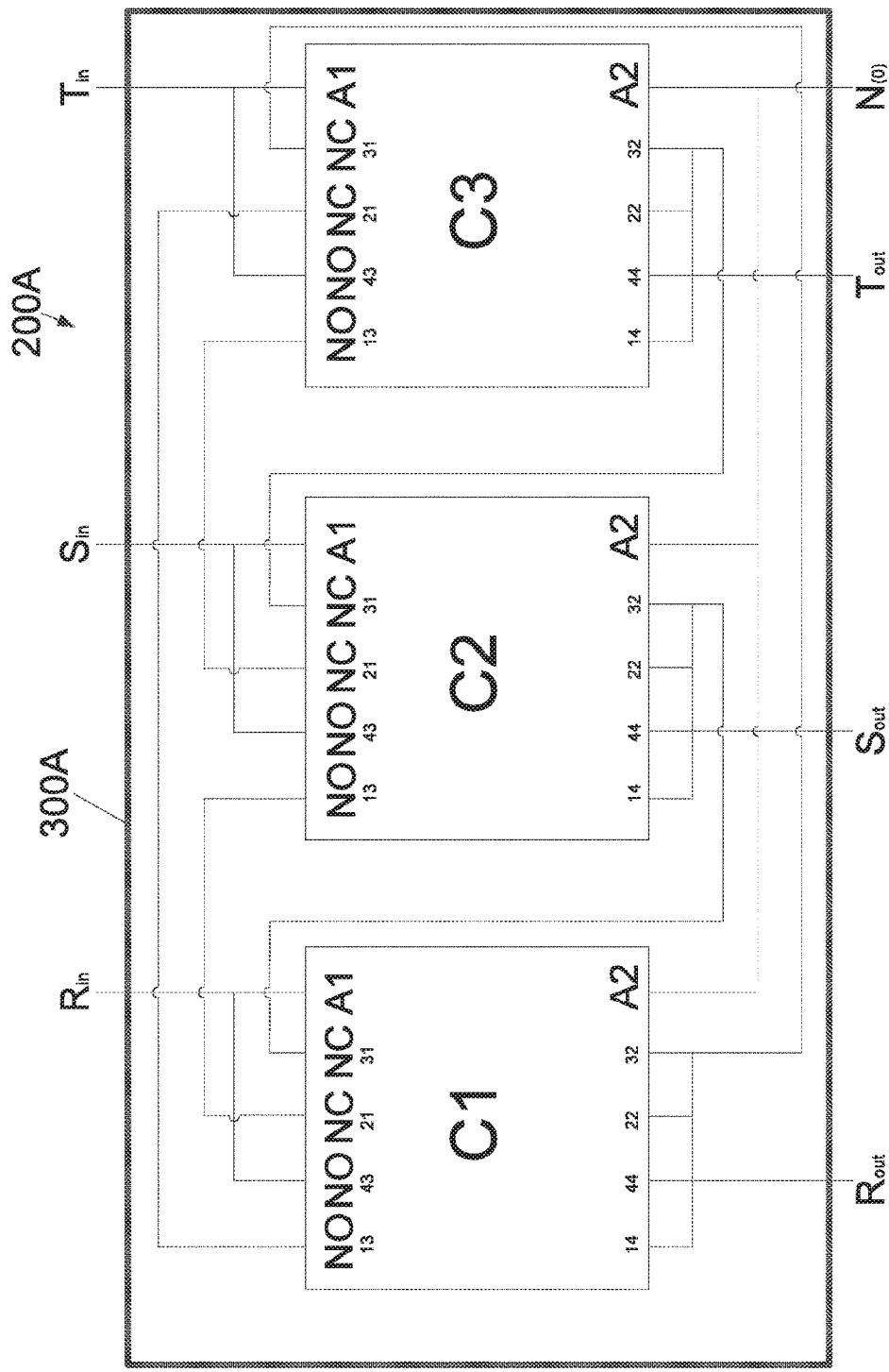
FIG. 6 shows another schematic representation of a three-phase compensation system 200A according to embodiments of the present invention.

FIG. 6 shows another schematic representation of a three-phase compensation system 200A according to embodiments of the present invention, comprising: a housing 300A comprising three control relays C1, C2 and C3 such as for example IEC control relay 700-K22Z available from http://ab.rockwellautomation.com/Relays-and-Timers/700-K-IEC-Control-Relays. Each control relay comprises two Normally Open contacts (13 and 43), two Normally Closed contacts (21 and 31) and a control contact (A1). Attention is drawn to control relay C3. In normal operation, contact A1 receives an electric current of phase T. The electric current passes from contact A1 to contact A2 connected to N (0), causes the connections between contacts 13 and 14 and between contacts 43 and 44 to be closed and the connections between contacts 21 and 22 and between contacts 31 and 32 to be opened thus enabling the electric current of phase T to pass from contact 43 to contact 44 to Tout.

The same happens in control relay C2 when it receives an electric current of phase S and in control relay C1 when it receives an electric current of phase R.

In the absence of electric current of phase T in control relay C3, the connections between contacts 13 and 14 and between contacts 43 and 44 are open and the connections between contacts 21 and 22 and between contacts 31 and 32 are close. In such a case, electric current of phase R may be supplied by:

Contact 13 of C1 to contact 21 of C3 to contact 22 of C3 to Tout. and/or

Contact 32 of C1 to contact 31 of C3 to contact 32 of C3 to Tout.

It will be appreciated that contact 43 of C1 may be alternatively connected to contact 31 of C3. In such a case, contact 32 of C1 is connected to contact 21 of C3.

The connection of contacts 21 and 31 of C3 to the electric current of phase R enables three-phase normal operation in the absence of phase T and moreover in the absence of at least one other phase (R or S), namely, in the absence of T and S or in the absence of T and R.

The connection of contacts 21 and 31 of C2 to the electric current of phase T enables three-phase normal operation in the absence of phase S and moreover in the absence of at least one other phase (R or T), namely, in the absence of S and R or in the absence of S and T.

The connection of contacts 21 and 31 of C1 to the electric current of phase S enables three-phase normal operation in the absence of phase R and moreover in the absence of at least one other phase (T or S), namely, in the absence of R and S or in the absence of R and T.

Figure 7:
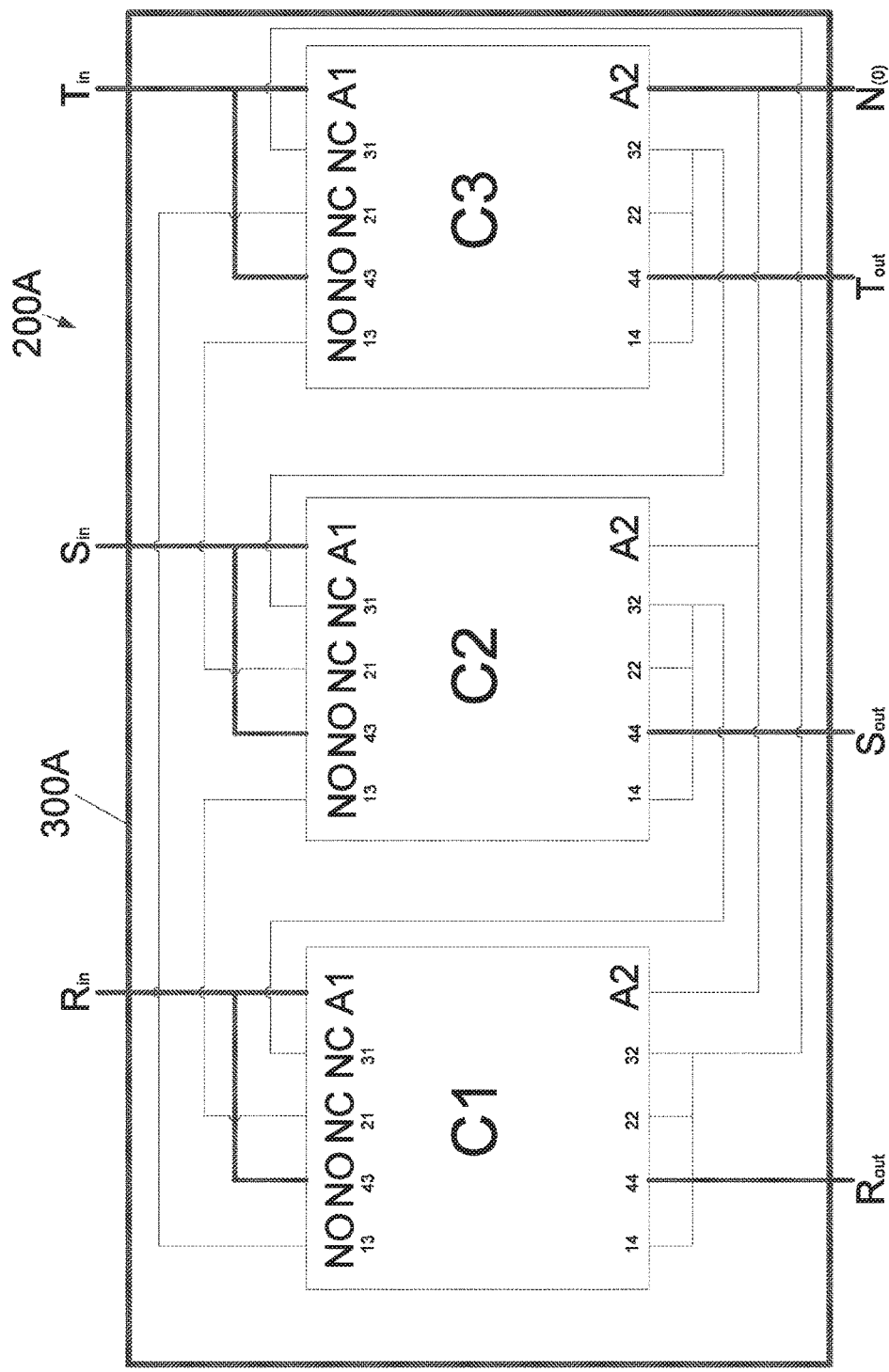
FIG. 7 shows an exemplary scenario according to the representation of FIG. 6 where there is an electric current in each phase R, S and T.

FIG. 7 shows an exemplary scenario according to the representation of FIG. 6 where there is an electric current in each phase R, S and T (normal operation). The electric current of phase T passes from contact A1 of C3 to contact A2 of C3 to N (0) and causes the connections between contacts 13 and 14 and between contacts 43 and 44 to be closed, namely, the electric current passes from Tin to contact 43 to contact 44 to Tout. The same happens in phases S and R.

Figure 7A:
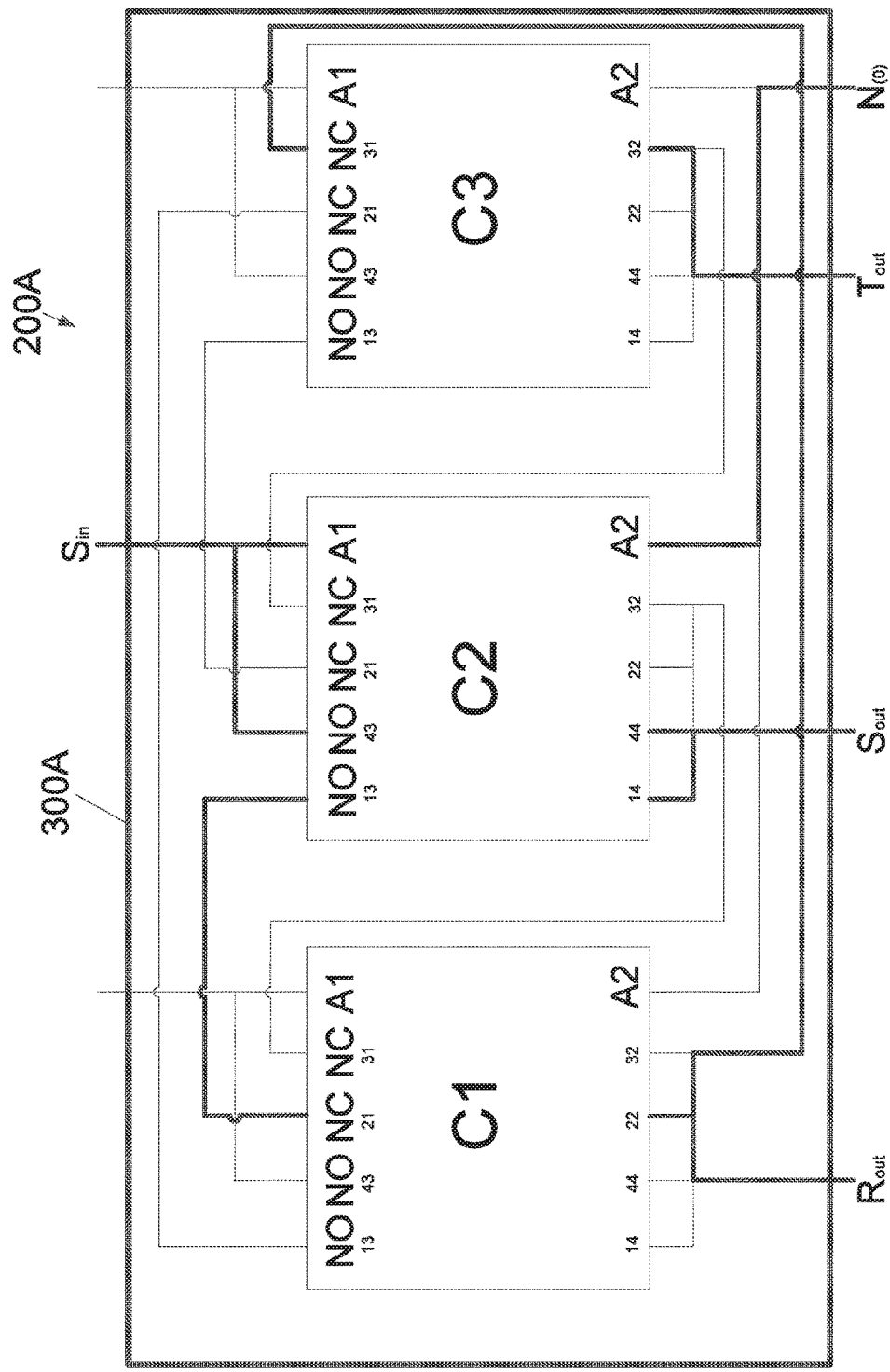
FIG. 7A shows an exemplary scenario according to the representation of FIG. 6 where there is an electric current only in phase S.

FIG. 7A shows an exemplary scenario according to the representation of FIG. 6 where there is an electric current only in phase S. The electric current of phase S passes from contact A1 of C2 to contact A2 of C2 to N (0) and causes the connections between contacts 13 and 14 and between contacts 43 and 44 to be closed, namely, the electric current pass from Sin to contact 43 to contact 44 to Sout. In C1 and C3 there is no electric current supplied by Rin and Tin respectively, hence the connections between contacts 21 and 22 and contacts 31 and 32 of C3 are closed and the connections between contacts 21 and 22 and contacts 31 and 32 of C1 are closed. Electric current supplied by Sin passes to contact 43 of C2 to contact 44 of C2 to contact 14 of C2 to contact 13 of C2 to contact 21 of C1, from contact 21 of C1 to contact 22 of C1 and from there both to Rout and to contact 31 of C3 to contact 32 of C3 to Tout.

The result is three-phase electric supply though only one phase is available.

Figure 7B:
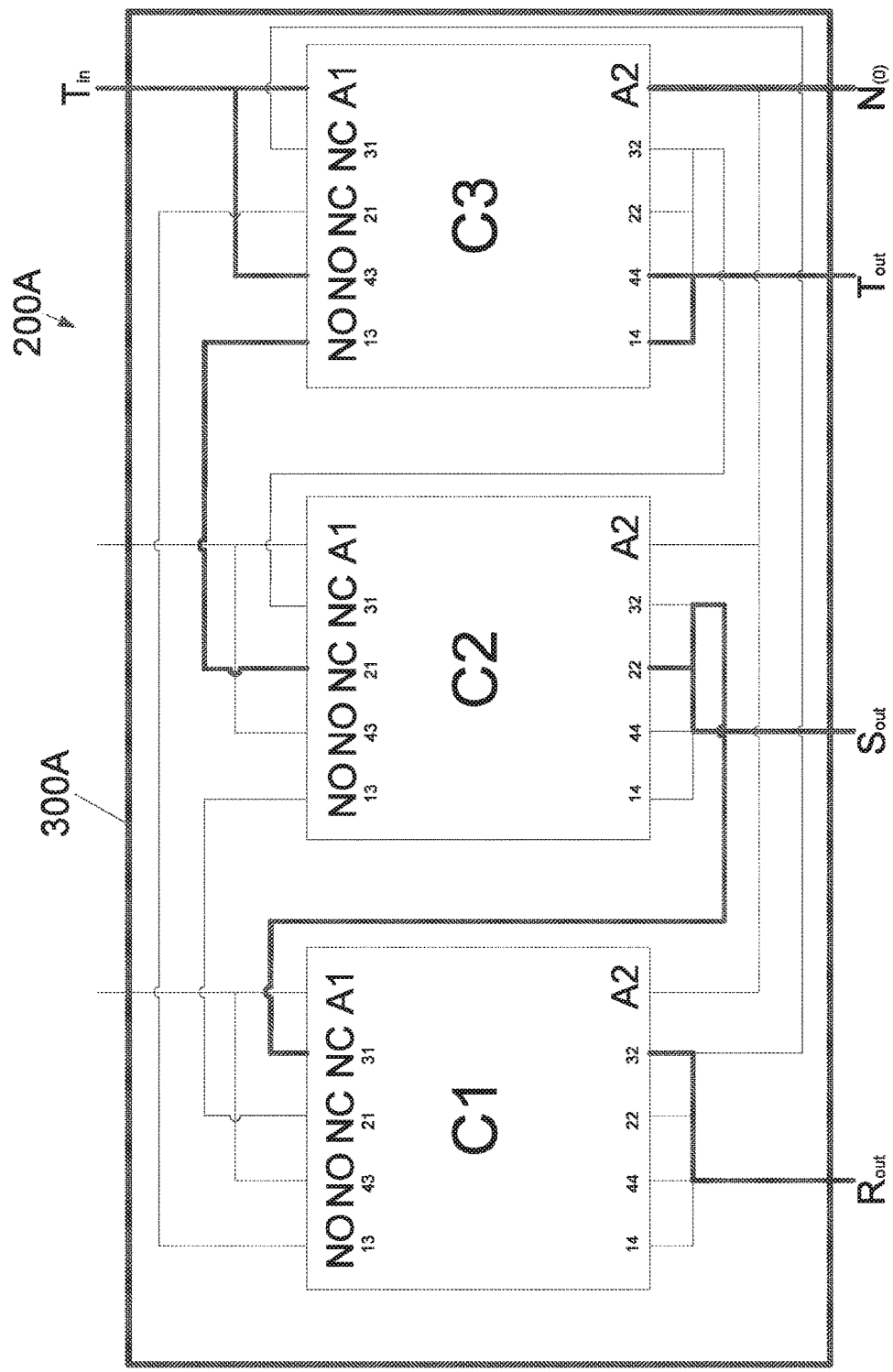
FIG. 7B shows an exemplary scenario according to the representation of FIG. 6 where there is an electric current only in phase T.

FIG. 7B shows an exemplary scenario according to the representation of FIG. 6 where there is an electric current only in phase T.

Figure 7C:
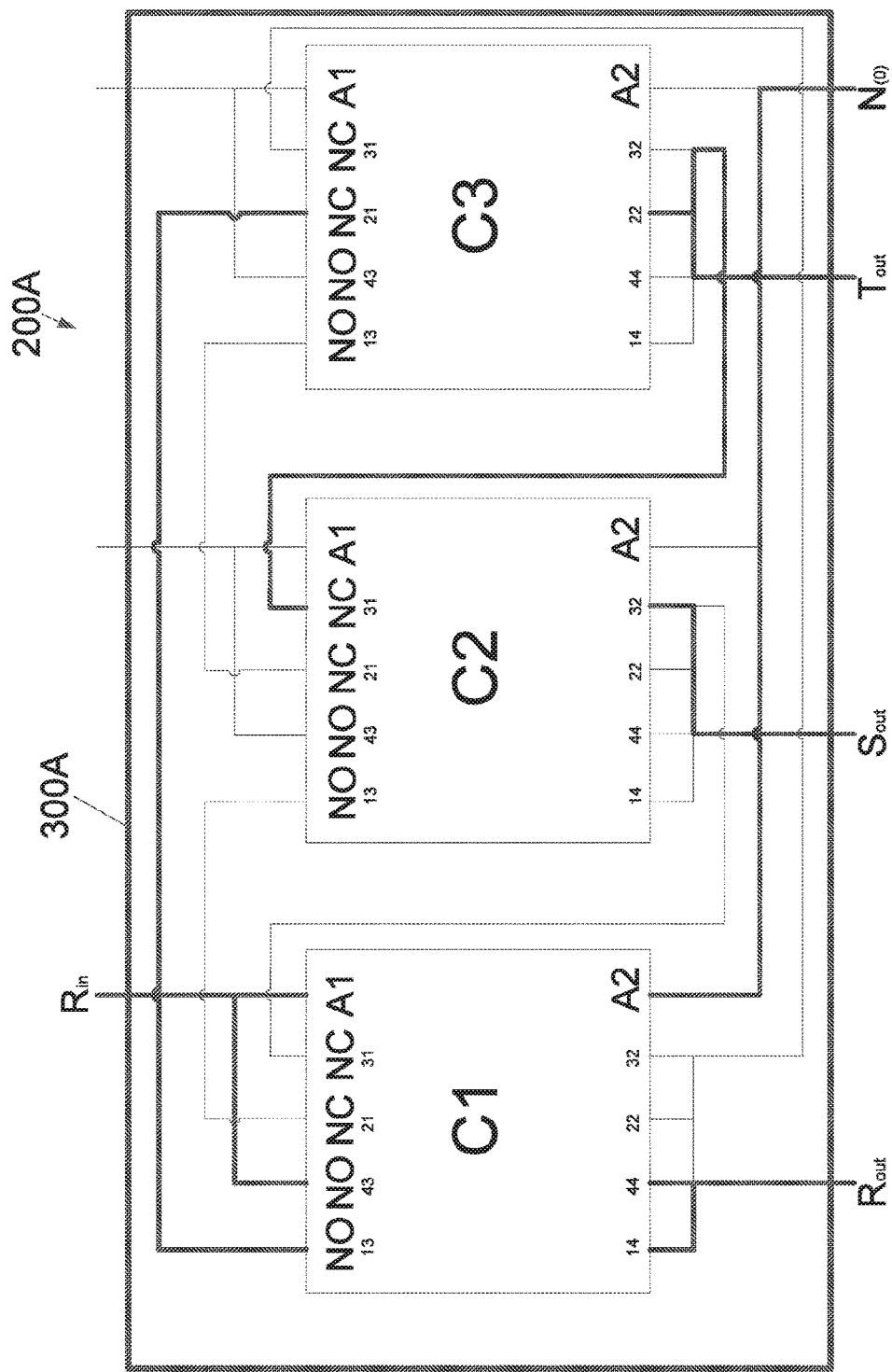
FIG. 7C shows an exemplary scenario according to the representation of FIG. 6 where there is an electric current only in phase R.

FIG. 7C shows an exemplary scenario according to the representation of FIG. 6 where there is an electric current only in phase R.

It will be appreciated that system 200A may be implemented instead of system 200 in FIGS. 2A and 2B.

It will be appreciated that the system of the present invention may be connected to any three-phase power source such as an electricity company, a three-phase alternator or any other three-phase power source.

The system of the present invention may be integrated for example in houses, ships, airplanes, etc. or in any system comprising a three-phase power source.

It will be appreciated that in cases that one or two of the phases malfunction, there might be a situation where the consumers need more than the working phase(s) can supply. In such a situation, the three-phase switch breaks the electrical circuit due to an overload. In order to prevent the three-phase switch from breaking the electrical circuit, the user may disconnect electric appliances, regardless of which phase they are connected to up the a point where the working phase(s) can supply the consumers' needs.

It will be appreciated by persons skilled in the art that the present invention is not limited to what has been particularly shown and described hereinabove. Rather the scope of the present invention is defined by the appended claims and includes combinations and sub-combinations of the various features described hereinabove as well as variations and modifications thereof which would occur to persons skilled in the art upon reading the foregoing description.

The invention claimed is:

1. A three-phase compensation system, comprising:
an electric circuit configured to receive three input phases of a three-phase power source, from which to supply three respective output phases, said electric circuit further configured to compensate for one or two malfunctioning input phases of said three input phases by supplying current from at least one functioning input phase of said three input phases to compensate for the one or two malfunctioning input phases, said electric circuit comprising interconnected first, second and third control relays, each comprising first and second normally open in-contacts, first and second normally open out-contacts, first and second normally closed in-contacts, first and second normally closed out-contacts, a control in-contact and a control out-contact, wherein a first phase-in is connected with said first control relay control in-contact and with said first control relay first normally open in-contact; said first control relay first normally open out-contact is connected with said first control relay second normally open in-contact; said first control relay second normally open in-contact is connected with said third control relay first normally closed in-contact; said first control relay first normally closed in-contact is connected with said second control relay second normally open in-contact; said first control relay second normally closed in-contact is connected with said second control relay second normally closed out-contact, with said second control relay first normally closed out-contact and with said second control relay second normally open out-contact; said first control relay second normally open out-contact is connected with a first phase-out, with said first control relay first normally closed out-contact, with said first control relay second normally closed out-contact and with said third control relay second normally closed in-contact; said second control relay second normally open out-contact is connected with a second phase-out; a second phase-in is connected with said second control relay control in-contact and with said second control relay first normally open in-contact; said second control relay first normally open out-contact is connected with said second control relay second normally open in-contact; said second control relay first normally closed in-contact is connected with said third control relay second normally open in-contact; said second control relay second normally closed in-contact is connected with said third control relay second normally closed out-contact, with said third control relay first normally closed out-contact and with said third control relay second normally open out-contact; said third control relay second normally open out-contact is connected with a third phase-out; a third phase-in is connected with said third control relay control in-contact and with said third control relay first normally open in-contact; said third control relay first normally open out-contact is connected with said third control relay second normally open in-contact; said first control relay control out-contact is connected with said second control relay control out-contact, with said third control relay control out-contact and with neutral.

2. A three-phase compensation system, comprising:
an electric circuit configured to receive three input phases of a three-phase power source, from which to supply three respective output phases, said electric circuit further configured to compensate for one or two malfunctioning input phases of said three input phases by supplying current from at least one functioning input phase of said three input phases to compensate for the one or two malfunctioning input phases, said electric circuit comprising interconnected first, second and third control relays, each comprising first and second normally open in-contacts, first and second normally open out-contacts, first and second normally closed in-contacts, first and second normally closed out-contacts, a control in-contact and a control out-contact, wherein a first phase-in is connected with said first control relay control in-contact and with said first control relay second normally open in-contact; said first control relay first normally open out-contact is connected with said first control relay second normally open out-contact, with said first control relay first normally closed out-contact and with said first control relay second normally closed out-contact; said first control relay first normally open in-contact is connected with said third control relay first normally closed in-contact; said first control relay first normally closed in-contact is connected with said second control relay first normally open in-contact; said first control relay second normally closed in-contact is connected with said second control relay second normally closed out-contact, with said second control relay first normally closed out-contact, with said second control relay first normally open out-contact and with said second control relay second normally open out-contact; said first control relay second normally open out-contact is connected with a first phase-out and with said third control relay second normally closed in-contact; said second control relay second normally open out-contact is connected with a second phase-out; a second phase-in is connected with said second control relay control in-contact and with said second control relay second normally open in-contact; said second control relay first normally closed in-contact is connected with said third control relay first normally open in-contact; said second control relay second normally closed in-contact is connected with said third control relay second normally closed out-contact, with said third control relay first normally closed out-contact, with said third control relay first normally open out-contact and with said third control relay second normally open out-contact; said third control relay second normally open out-contact is connected with a third phase-out; a third phase-in is connected with said third control relay control in-contact and with said third control relay second normally open in-contact; said first control relay control out-contact is connected with said second control relay control out-contact, with said third control relay control out-contact and with neutral.

3. A method of compensating for a lost phase of a three-phase power source, comprising providing an electric circuit configured to receive three input phases of a three-phase power source, from which to supply three respective output phases, said electric circuit further configured to compensate for one or two malfunctioning input phases of said three input phases by supplying current from at least one functioning input phase of said three input phases to compensate for the one or two malfunctioning input phases, said electric circuit comprising interconnected first, second and third control relays, each comprising first and second normally open in-contacts, first and second normally open out-contacts, first and second normally closed in-contacts, first and second normally closed out-contacts, a control in-contact and a control out-contact, wherein a first phase-in is connected with said first control relay control in-contact and with said first control relay second normally open in-contact; said first control relay first normally open out-contact is connected with said first control relay second normally open out-contact, with said first control relay first normally closed out-contact and with said first control relay second normally closed out-contact; said first control relay first normally open in-contact is connected with said third control relay first normally closed in-contact; said first control relay first normally closed in-contact is connected with said second control relay first normally open in-contact; said first control relay second normally closed in-contact is connected with said second control relay second normally closed out-contact, with said second control relay first normally closed out-contact, with said second control relay first normally open out-contact and with said second control relay second normally open out-contact; said first control relay second normally open out-contact is connected with a first phase-out and with said third control relay second normally closed in-contact; said second control relay second normally open out-contact is connected with a second phase-out; a second phase-in is connected with said second control relay control in-contact and with said second control relay second normally open in-contact; said second control relay first normally closed in-contact is connected with said third control relay first normally open in-contact; said second control relay second normally closed in-contact is connected with said third control relay second normally closed out-contact, with said third control relay first normally closed out-contact, with said third control relay first normally open out-contact and with said third control relay second normally open out-contact; said third control relay second normally open out-contact is connected with a third phase-out; a third phase-in is connected with said third control relay control in-contact and with said third control relay second normally open in-contact; said first control relay control out-contact is connected with said second control relay control out-contact, with said third control relay control out-contact and with neutral.

4. A method of compensating for a lost phase of a three-phase power source, comprising providing an electric circuit configured to receive three input phases of a three-phase power source, from which to supply three respective output phases, said electric circuit further configured to compensate for one or two malfunctioning input phases of said three input phases by supplying current from at least one functioning input phase of said three input phases to compensate for the one or two malfunctioning input phases, said electric circuit comprising interconnected first, second and third control relays, each comprising first and second normally open in-contacts, first and second normally open out-contacts, first and second normally closed in-contacts, first and second normally closed out-contacts, a control in-contact and a control out-contact, wherein a first phase-in is connected with said first control relay control in-contact and with said first control relay second normally open in-contact; said first control relay first normally open out-contact is connected with said first control relay second normally open out-contact, with said first control relay first normally closed out-contact and with said first control relay second normally closed out-contact; said first control relay first normally open in-contact is connected with said third control relay first normally closed in-contact; said first control relay first normally closed in-contact is connected with said second control relay first normally open in-contact; said first control relay second normally closed in-contact is connected with said second control relay second normally closed out-contact, with said second control relay first normally closed out-contact, with said second control relay first normally open out-contact and with said second control relay second normally open out-contact; said first control relay second normally open out-contact is connected with a first phase-out and with said third control relay second normally closed in-contact; said second control relay second normally open out-contact is connected with a second phase-out; a second phase-in is connected with said second control relay control in-contact and with said second control relay second normally open in-contact; said second control relay first normally closed in-contact is connected with said third control relay first normally open in-contact; said second control relay second normally closed in-contact is connected with said third control relay second normally closed out-contact, with said third control relay first normally closed out-contact, with said third control relay first normally open out-contact and with said third control relay second normally open out-contact; said third control relay second normally open out-contact is connected with a third phase-out; a third phase-in is connected with said third control relay control in-contact and with said third control relay second normally open in-contact; said first control relay control out-contact is connected with said second control relay control out-contact, with said third control relay control out-contact and with neutral.

\* \* \* \* \*